United States Patent [19]
Seekins et al.

[11] Patent Number: 5,949,774
[45] Date of Patent: Sep. 7, 1999

[54] METHOD OF PROCESSING A CALL WHILE SWITCHING SITE AFFILIATION IN A RADIO COMMUNICATION SYSTEM

[75] Inventors: David S. Seekins, Sunrise; Robert H. Pichette, Plantation; David R. Heeschen, Coconut Creek, all of Fla.

[73] Assignee: Motorola, Inc., Schaumburg, Ill.

[21] Appl. No.: 09/055,386

[22] Filed: Apr. 6, 1998

[51] Int. Cl.[6] .................................................. H04Q 7/38
[52] U.S. Cl. ........................... 370/331; 455/435; 455/436
[58] Field of Search ............................. 370/331; 455/432, 455/433, 435–444, 456, 457

[56] References Cited

U.S. PATENT DOCUMENTS

| | | | |
|---|---|---|---|
| 5,103,306 | 4/1992 | Welman et al. ........................ | 358/133 |
| 5,222,248 | 6/1993 | McDonald et al. .................... | 455/33.2 |
| 5,260,943 | 11/1993 | Comroe et al. ....................... | 370/95.1 |
| 5,276,906 | 1/1994 | Felix ...................................... | 455/33.2 |
| 5,649,291 | 7/1997 | Tayloe .................................... | 370/455 |
| 5,649,303 | 7/1997 | Hess et al. ............................. | 455/63 |
| 5,732,350 | 3/1998 | Marko et al. .......................... | 455/435 |
| 5,748,620 | 5/1998 | Capurka ................................. | 370/328 |

*Primary Examiner*—Melvin Marcelo
*Attorney, Agent, or Firm*—Andrew S. Fuller

[57] ABSTRACT

A subscriber unit handles incoming calls routed through an old server site while in the process of switching site affiliation to a new server site (500). The subscriber unit initiates the switching of site affiliation (510), and during the process, alternates between receiving communication from the new server site (520) and receiving communication from the old server site to monitor for an incoming call (530). When an incoming call routed through the old server site is detected (540), the subscriber unit aborts or suspends the switching process and accepts the incoming call through the old server site (551, 552).

13 Claims, 6 Drawing Sheets

METHOD OF PROCESSING A CALL WHILE SWITCHING SITE AFFILIATION IN A RADIO COMMUNICATION SYSTEM

TECHNICAL FIELD

This invention relates in general to radio communication systems, and more particularly, to the handling of incoming calls while switching affiliation between server sites of a radio communication system.

BACKGROUND OF THE INVENTION

Geographically dispersed transceiver sites are often employed in two-way radio communication systems to support subscribers operating over a wide coverage area. Ordinarily, the sites are arranged such that each provides coverage for a particular geographic region, which may have some overlap. A subscriber unit interfaces with a radio communication system through a particular transceiver site, referred to herein as a server site or cell site. When a subscriber unit moves from one location to another, it may be advantageous to switch site affiliation, such as to a neighboring site, in order to ensure a high quality communication link. Prior to switching site affiliation, a subscriber unit usually monitors communications from potential server sites in order to select a suitable site server site.

A particular problem may occur when a subscriber unit initiates the switching of affiliation from one site to another, in that there is a possibility of missing incoming calls. Consider a subscriber unit that is affiliated with a first site in a radio communication system. The radio system routes calls destined for the subscriber unit via that site. The subscriber unit may switch affiliation to a second site by obtaining particular information from the second site for setup and registration purposes, and by registering affiliation with the second site. Upon detection of this change in site affiliation, the radio system is alerted to route calls destined for the subscriber unit through the second site. Although the process to switch site affiliation may take but a few seconds, a problem exists in prior systems employing this method in that calls may be lost during the transition from the first site to the second site.

It is desirable to provide an enhanced procedure for changing site affiliation that reduces the potential of lost calls. Therefore, a new method of processing a call while switching site affiliation in a radio communication system is needed.

DETAILED DESCRIPTION OF THE PREFERRED EMBODIMENT

The present invention provides a procedure for use by a subscriber unit when transitioning from a first site to a second to avoid missing incoming calls routed to the first site during the transition period. Particularly, when the subscriber unit executes a procedure to effect a transition of cell affiliation from a first cell site to a second cell site, it alternates between receiving communication from the second cell site and receiving communication from the first cell site to monitor for an incoming call during the transition. Preferably, if an incoming call is detected while switching site affiliation, the subscriber unit aborts or suspends the procedure to switch site affiliation, accepts the incoming call through the first site, and later transfers that call, if necessary, to the second site. In the preferred embodiment, the first site and second site has first and second synchronized control channels, respectively, and the control channels have broadcast slots and control data slots. Incoming calls to the first site are detected by monitoring the control data slots of the first control channel, in between monitoring broadcast slots of the second control channel.

Figure 1:
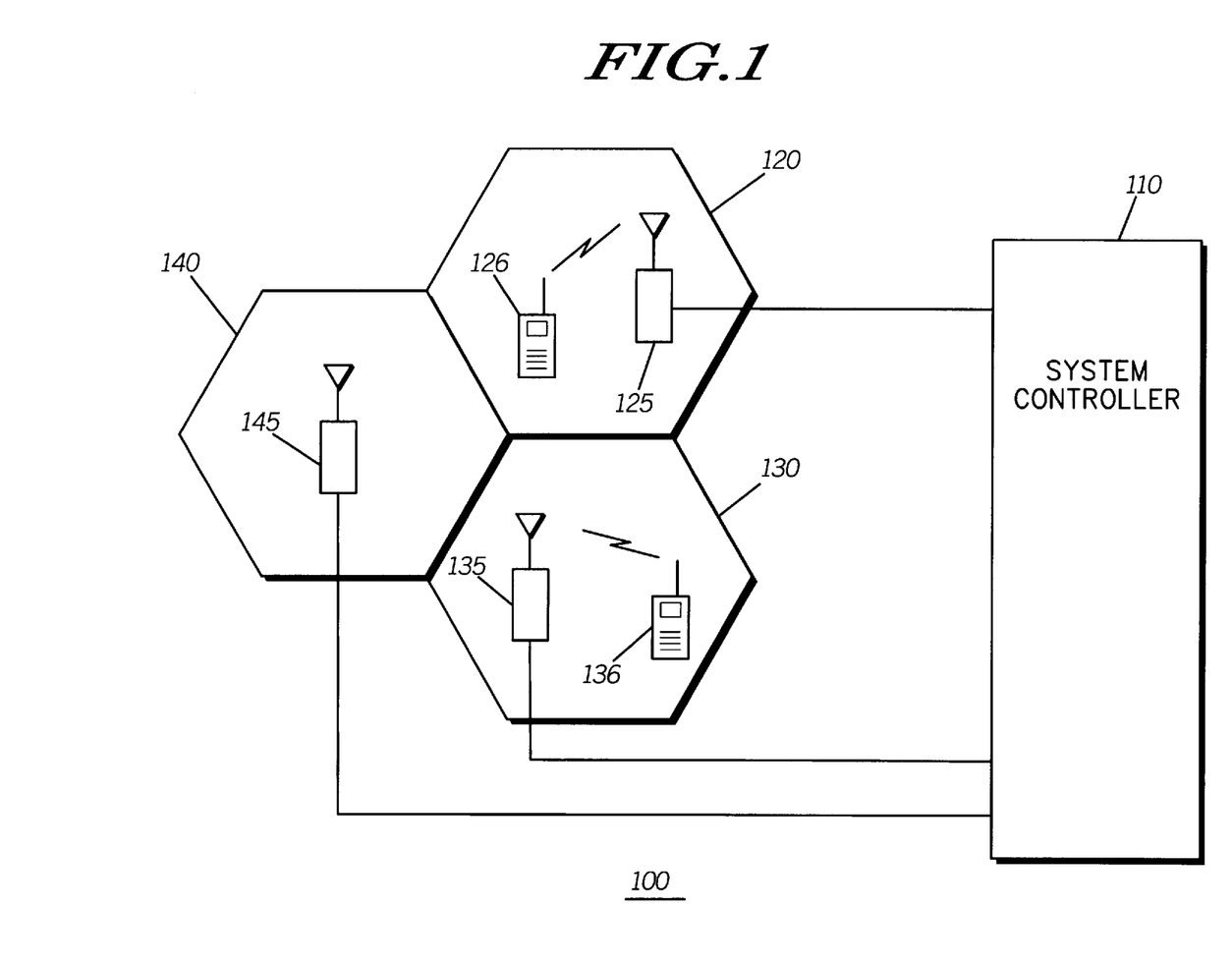
FIG. 1 is a representation of a radio communication system operating in accordance with the present invention.

FIG. 1 shows a block diagram of a radio communication system 100, operating in accordance with the present invention. In the preferred embodiment, the communication system 100 provides a radio network infrastructure that supports telephone, dispatch, data, and other communication services over a wireless network. Wireless communications occur over the network using a time division multiple access (TDMA) protocol, which is described in more detail below.

The system 100 includes a system controller site 110, coupled communication cell sites 125, 135, 145, and subscriber units 126, 136. The controller 110 includes computational and communication equipment that implement management functions for the radio communication system 100. For example, the controller 110 manages and coordinates communication access to and from each subscriber unit 126, 136 through the sites 125, 135, 145 and allocates communication resources at each site. Additionally, the controller 110 coordinates communication between participants of the communication system and entities (not shown) external to the system 100, such as to a public switched telephone network, and the like. The system 100 has a coverage area that includes separate coverage regions 120, 130, 140, which typically overlap (overlapping not shown). Each coverage region is supported by one of the cell sites 125, 135, 145. The cell sites 125, 135, 145 preferably comprise radio transceivers that function as base stations. The cell sites 125, 135, 145 are configured to support subscriber communication within their respective coverage regions.

The subscriber units 126, 136 are two-way wireless devices, such as portable or mobile two-way radio transceivers, or other electronic device with a wireless communication portion. Generally, a subscriber unit operates within the radio system 100 through an affiliated site using communication resources, such as wireless frequencies, allocated for use by that site. The affiliated site is referred to herein as a server site or server cell site. When a subscriber unit moves from the coverage area of a first site into the coverage area of a second site, site affiliation may be transferred from the first site to the second site in order to maintain a communication link. This process is known as hand-over or hand-off when such transfer occurs during an ongoing call. Hand-over protocols for TDMA systems are known in the art as is exemplified in U.S. Pat. No. 5,159,593, issued to D'Amico, et al on Oct. 27, 1992 for Channel Acquisition and Hand-Off Method and Apparatus for a TDMA Communication System. The subscriber unit may elect to transfer site affiliation, even when there is no ongoing call, because factors such as received signal strength, signal reception quality, user preference, and other such parameters, may dictate that a different site be used. Ordinarily, the subscriber unit maintains a monitor list or neighbor cell list that contains information needed for monitoring neighboring sites to determine potential server sites. When a particular server site is selected as a new server site, the subscriber unit acquires setup information from the new sever site and registers affiliation with that site.

Figure 2:
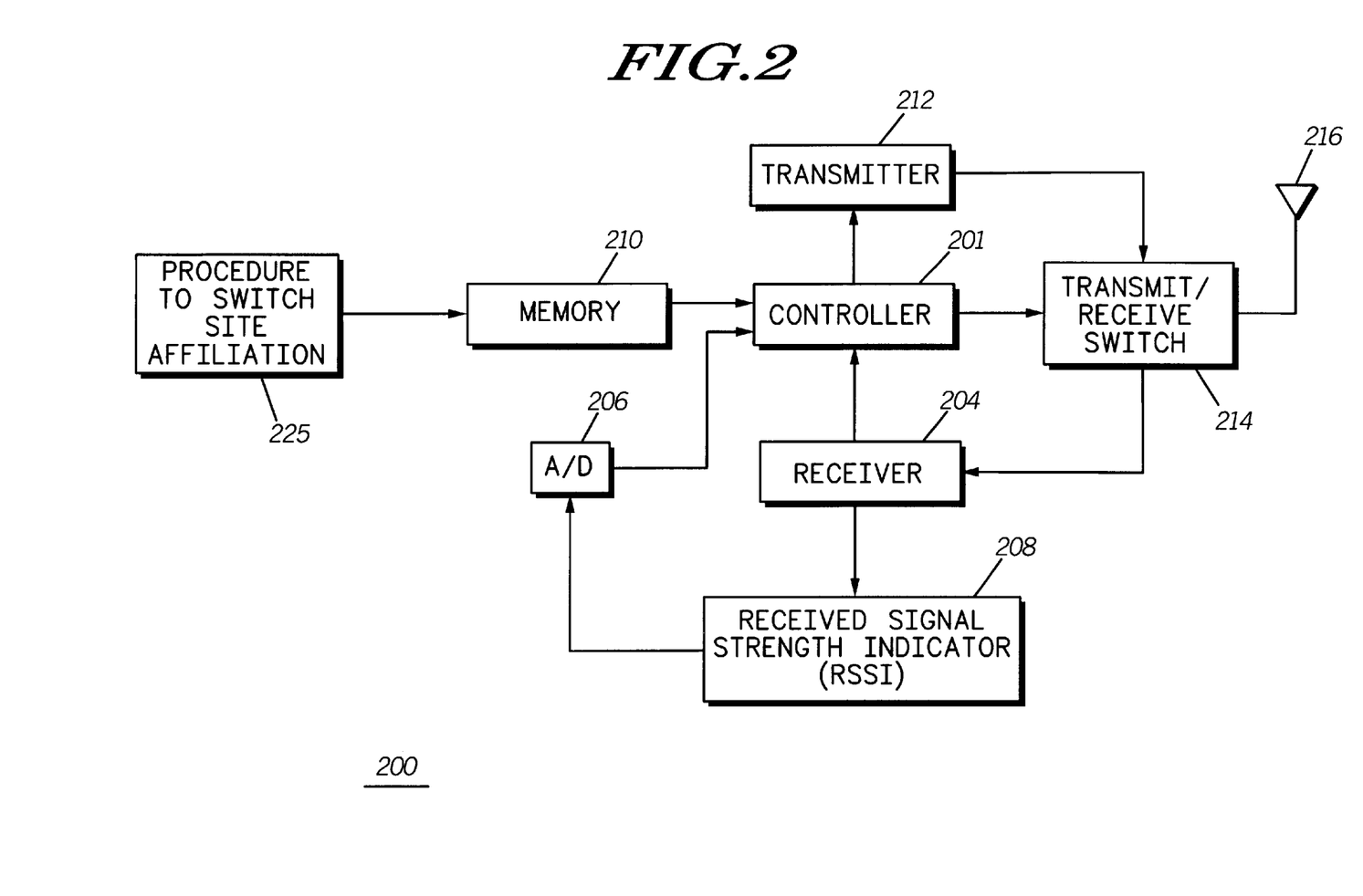
FIG. 2 is a block diagram of a subscriber unit, in accordance with the present invention.

FIG. 2 is a block diagram of a subscriber unit 200, in accordance with the present invention. The subscriber units 126, 136 of FIG. 1 are of similar construction. A controller 201 provides operational control for the subscriber unit 200 by executing well-known instructions which are stored in a coupled memory 210. A transmitter 212 is operably coupled to the controller 201, and to an antenna 216 through a transmit/receive (T/R) switch 214. The T/R switch 214 is selectively coupled to the transmitter 212 by the controller 201 to enable transmission of signals through the antenna 216. For receive operations, the antenna 216 is coupled signals through the T/R switch 214 to a receiver 204. The receiver 204 decodes the received signals and presents those signals to the controller 201 for processing. A signal strength indicator (RSSI) signal is generated by a RSSI circuit 208, based at least in part on the signal strength corresponding to the received signals. The RSSI circuit 208 uses an analog to digital converter 206 to present a digital RSSI to the controller 201. Using the RSSI signal, the controller 201 determines information regarding the proximity of the site to the subscriber unit 200. According to the present invention, the subscriber unit 200 incorporates a procedure to switch site affiliation 225 that is stored in memory 210. The procedure 225 enables monitoring for incoming calls routed through the old site, while receiving setup information from the new site.

Figure 3:
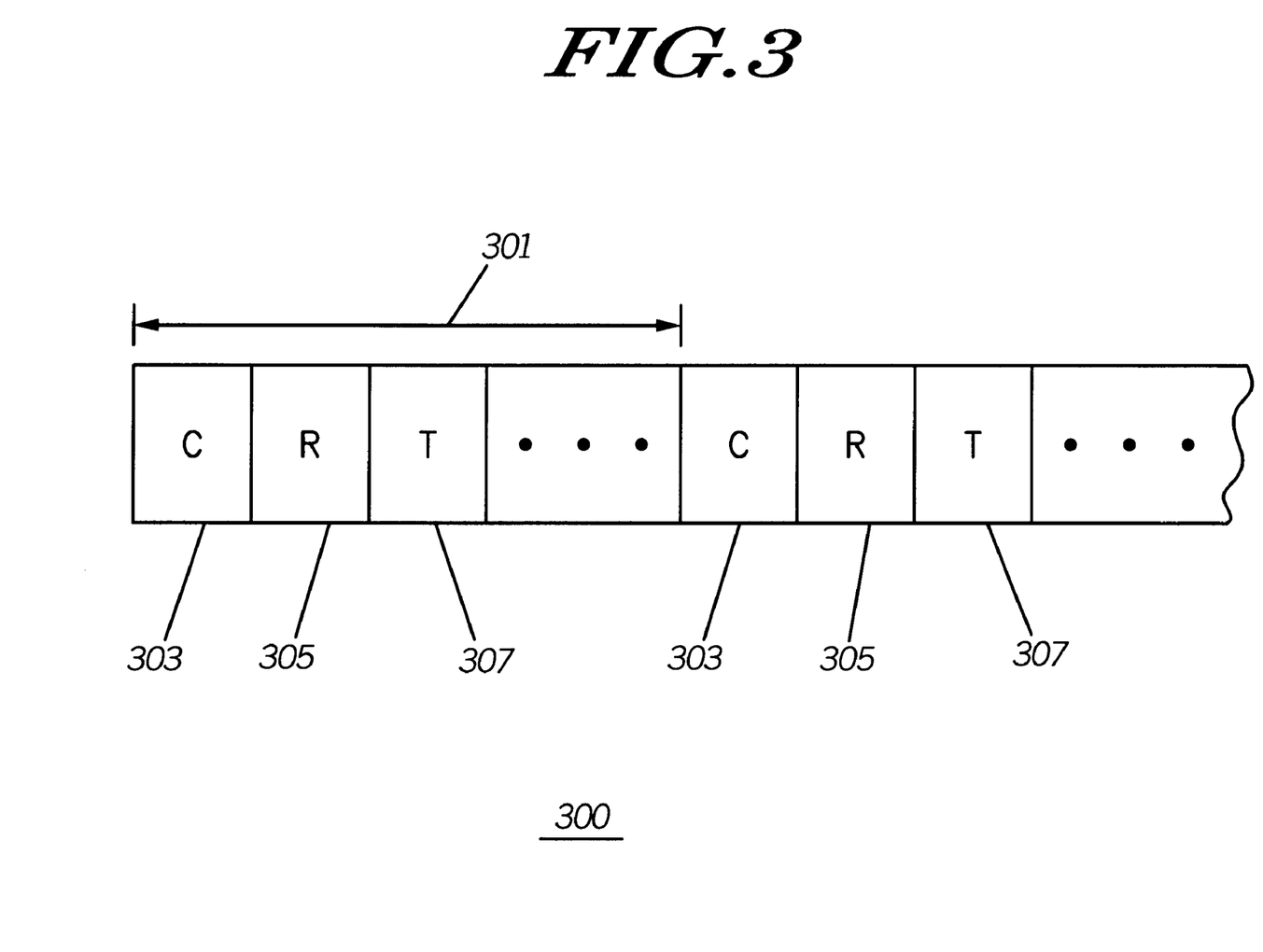
FIG. 3 is a block representation of a time division multiple access protocol frame, in accordance with the present invention.

As mentioned earlier, the system operates using a TDMA protocol. Under the TDMA protocol, a communication resource, such as a wireless carrier frequency, is divided into time frames, and the frames are subdivided into time slots. FIG. 3 shows a block representation 300 of such a TDMA frame. In this particular TDMA frame 301, the first time slot 303 is designated as a control slot in which resource management information is communicated. In a typical implementation, there is frequent communication activity on the control slot 303. Communication on the control slot includes resource allocation and management information, identification information, and the like. Other slots 305, 307 are designated as transmit and receive slots. In some implementations, transmit and receive slots are implemented in separate frames. Several communication units may share a frame, each with its designated slot for transmit or receive operations. With this arrangement, a subscriber unit may be engaged in communications with another subscriber unit or other communicant during its transmit and receive slots, but generally has time between receive and transmit operations (dead time), and during periods of communication inactivity for monitoring and other purposes.

Figure 4:
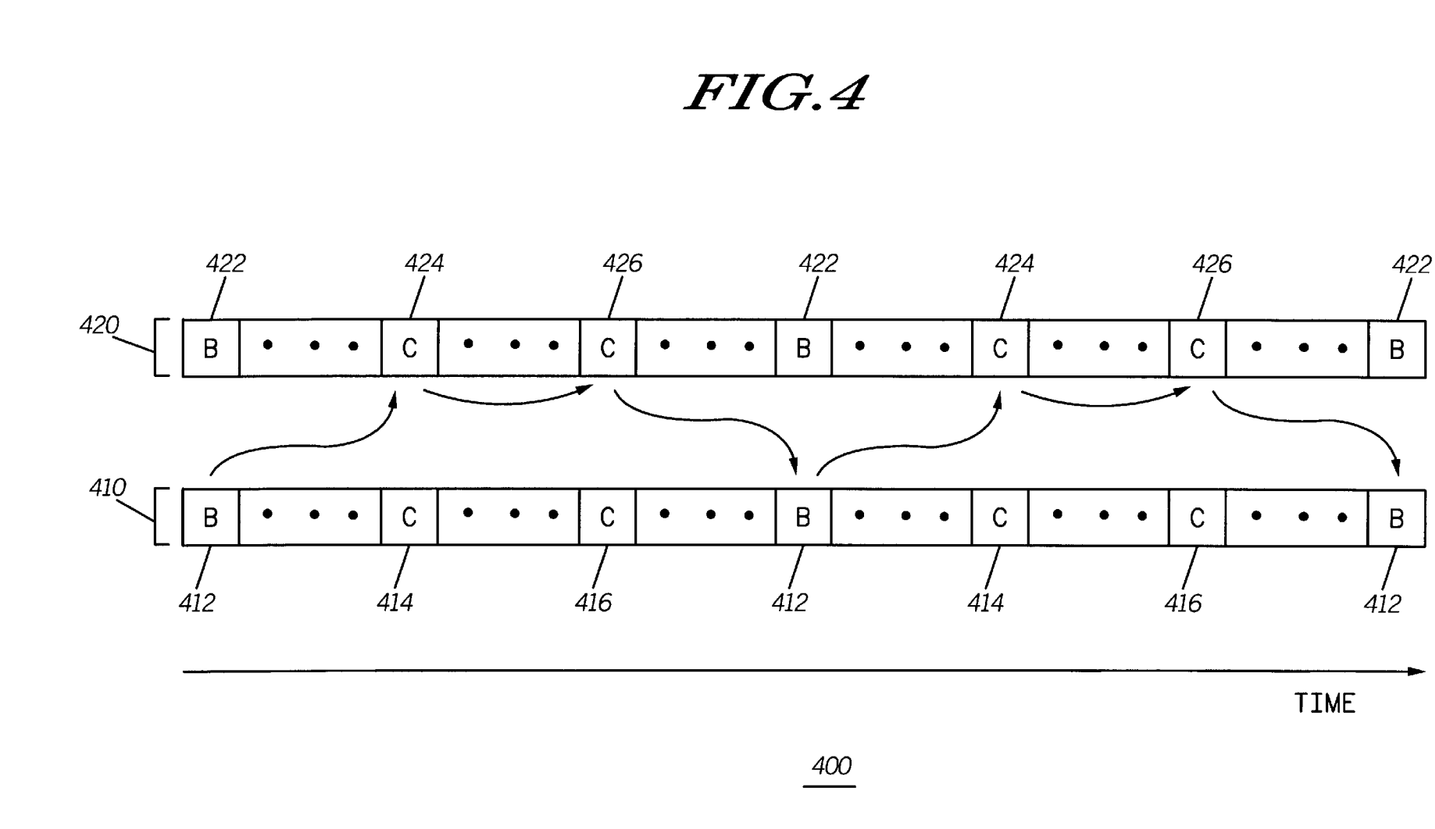
FIG. 4 is a block diagram of control channels corresponding to first and second cell sites, and highlighting the alternating monitoring of time slots across the control channels to detect incoming calls, in accordance with the present invention.

In the preferred embodiment, the cell sites 125, 135, 145 each operate at least one control channel that is organized using TDMA principles. FIG. 4 is a timing diagram 400 depicting the monitoring of TDMA time slots for control channels 420, 410 corresponding to first and second server sites, such as cell sites 125, 135, in accordance with the present invention. The control channels 420, 410 are operated by the first and second sites, respectively, and have synchronous time slots including synchronized broadcast channel slots 412, 422, and synchronized common control channel slots 414, 424, 416, 426. The broadcast slots 412, 422 are used by the server sites to broadcast cell data, i.e., to communicate cell data information needed by a subscriber unit for setup and registration purposes. As is typical with TDMA systems, these broadcast slots 412, 422 are temporally separated communication slots of the respective control channels 410, 420. The control slots 414, 424, 416, 426 are used for subscriber interaction, i.e., for the communication of control data between a subscriber unit and its corresponding server site. The control slots are temporally separated communication slots that are interspersed between the broadcast slots.

Figure 5:
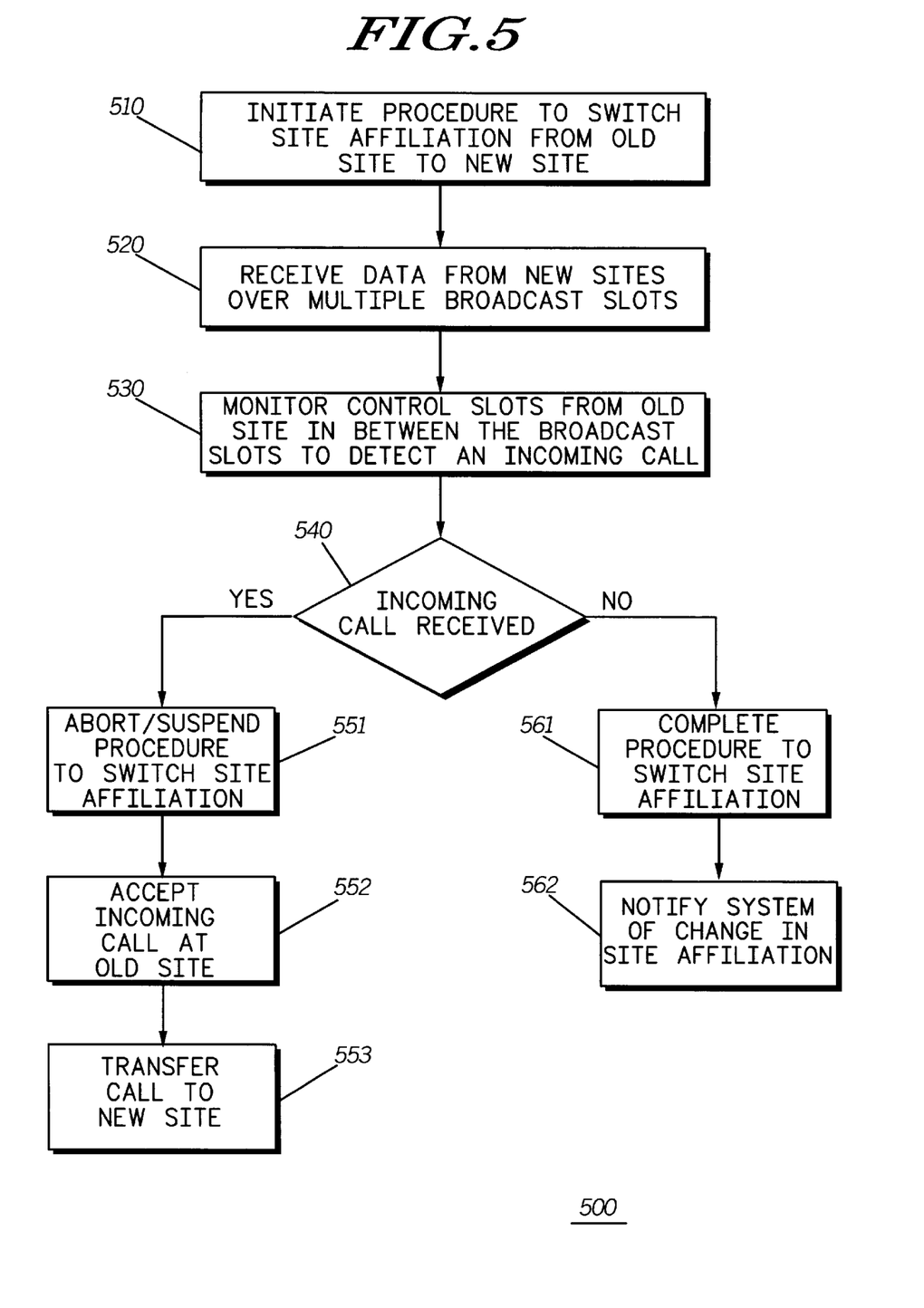
FIG. 5 is a summary of procedures used by the subscriber unit to monitor for incoming calls while switching site affiliation, in accordance with the present invention.

FIG. 5 is a flowchart 500 summarizing the procedure used by the subscriber unit when switching site affiliation between a first and second server site of a radio communication system, in accordance with the present invention. With reference to FIG. 4 and FIG. 5, a subscriber unit affiliated with a first server site initiates a procedure to switch site affiliation from the first server site to a second server site, step 510. In the preferred embodiment, the decision to switch site affiliation is made when the subscriber unit is in idle mode, i.e., during a period of time when the subscriber unit is not engaged in an ongoing call. As part of the switching process, the subscriber unit receives setup data from the second cell site on the broadcast slots 412 of the second control channel 410, step 520. The setup data is received on successive broadcast slots 412 of the second control channel over a period of time until all the necessary data is obtained.

According to the present invention, the subscriber unit monitors for incoming calls routed through the first cell site during the period of time consumed by the switching process, i.e., the transition period. As such, the subscriber unit monitors control slots 424, 426 of the first control channel 420 for communication to detect an incoming call received by the first cell site during the transition period, step 530. When an incoming call received by the first cell site is detected during the transition period, step 540, the procedure to switch site affiliation is preferably aborted or suspended, step 551, and the incoming call accepted through communication with the first cell site, step 552. If necessary, the incoming call is transferred from the first cell site to the second site, for continued processing, by executing or initiating a hand-over or other procedure to transfer ongoing calls, step 553. This transfer may occur immediately after accepting the call. When no incoming call is detected, the procedure to switch site affiliation is completed and the subscriber unit notifies the radio communication system of the change in site affiliation through registration with the new site, steps 540, 561, 562.

Figure 6:
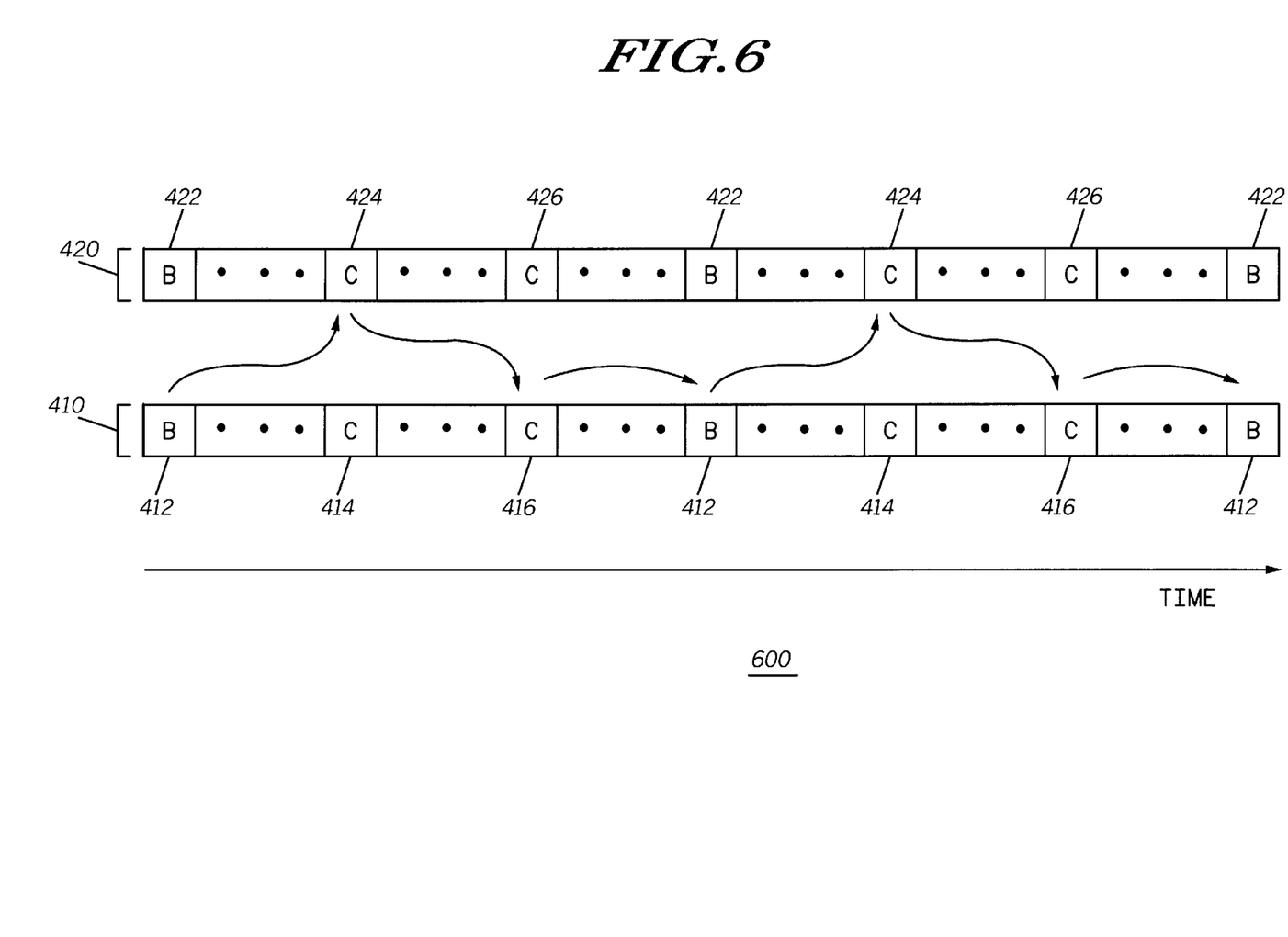
FIG. 6 is a block diagram of control channels corresponding to first and second cell sites showing an alternative for monitoring time slots across the control channels to detect incoming calls, in accordance with the present invention.

FIG. 6 is a timing diagram 600 depicting an alternative embodiment for monitoring control channels 420, 410 corresponding to first and second cell sites, in accordance with the present invention. As before, the subscriber unit periodically receives setup data from the second cell site during the procedure to switch site affiliation via the broadcast slots 412. However here, the subscriber unit alternately monitors control slots 424 of the first control channel 420 and control slots 416 of the second control channel 410 to detect whether an incoming call is received on the first cell site or on the second cell site. Otherwise, the procedure to switch site affiliation is as described with respect to FIG. 4 and FIG. 5.

Accordingly, in a radio communication system, a procedure is provided for a subscriber unit to handle an incoming call routed through a first cell site during a transition of switching affiliation from the first cell site to a second cell site. The subscriber unit receives setup data from the second cell site on temporally separated communication slots of the second cell site's control channel. Particularly, communication slots corresponding to a control channel of the first cell site are monitored, in between the temporally separated communication slots of the second control channel, to detect an incoming call received by the first cell site. In one embodiment, the subscriber unit alternately receives information from a first cell site and from a second cell site, on control data time slots that are interspersed between the successive broadcast time slots, to monitor for an incoming call received by the first cell site or by the second cell site during the transition.

The present invention provides for significant advantages over the prior art. By utilizing gaps in the receipt of communication from a new site during a registration process to monitor for incoming calls routed through the old site, the likelihood of missing calls is reduced. This approach is particularly useful in TDMA systems in which registration data is communicated using control slots on synchronous control channels.

What is claimed is:

1. In a subscriber unit of a radio communication system having first and second cell sites that operate on first and second control channels, respectively, a method of handling an incoming call while switching affiliation from the first cell site to the second cell site, the method comprising the steps of:

receiving setup data from the second cell site on temporally separated communication slots of the second control channel, as part of a process to switch affiliation from the first cell site to the second cell site; and monitoring communication from the first cell site on communication slots of the first control channel, in between the temporally separated communication slots of the second control channel, to detect an incoming call received by the first cell site.

2. The method of claim 1, further comprising the steps of, when an incoming call received by the first cell site is detected:

accepting the incoming call on the first cell site; and transferring handling of the call from the first cell site to the second cell site to continue processing of the incoming call.

3. The method of claim 1, wherein the first and second control channels each comprises broadcast channel slots and common control channel slots interspersed between the broadcast channel slots, and wherein the steps of receiving and monitoring further comprise the steps of, alternately:

receiving setup data on the broadcast channel slots of the second cell site; and monitoring for incoming call data on the common control channel slots of the first cell site.

4. The method of claim 3, wherein the steps of receiving and monitoring further comprise the steps of, alternately monitoring for incoming call data on the common control channel slot of the first cell site and on the common control channel slot of the second cell site.

5. In a subscriber unit of a radio communication system having first and second cell sites, a method comprising the steps of:

executing a procedure to effect a transition of site affiliation from a first cell site to a second cell site; and alternating between receiving communication from the second cell site and receiving communication from the first cell site to monitor for an incoming call during the transition.

6. The method of claim 5, further comprising the steps of:

detecting an incoming call on the first cell site during the transition, and upon such detection:

communicating with the first cell site to accept the incoming call; and initiating transfer of the incoming call from the first cell site to the second cell site to continue processing of the incoming call immediately after accepting the incoming call.

7. The method of claim 5, wherein the first and second cell sites have synchronized broadcast time slots with one or more synchronized control data time slots that are interspersed between the broadcast time slots, and wherein the step of alternating comprises the steps of:

receiving information from the second cell site on successive broadcast time slots; and receiving information from the first cell site on control data time slots that are interspersed between the successive broadcast time slots to monitor for an incoming call received by the first cell site during the transition.

8. The method of claim 5, wherein the first and second cell sites have synchronized broadcast time slots with one or more synchronized control data time slots that are interspersed between the broadcast time slots, and wherein the step of alternating comprises the steps of:

receiving information from the second cell site on successive broadcast time slots; and alternately receiving information from the first cell site and from the second cell site on control data time slots that are interspersed between the successive broadcast time slots to monitor for an incoming call received by the first cell site or by the second cell site during the transition.

9. A method of processing a call between server sites in a radio communication system, comprising the steps of:

initiating a procedure to switch site affiliation from a first cell site to a second cell site;

periodically receiving setup data from the second cell site during the procedure;

monitoring the first cell site during gaps in receipt of setup data from the second cell site to detect an incoming call routed through the first cell site;

when an incoming call is detected:
reverting to the first cell site to accept the call; and
transferring handling of the call from the first cell site to the second cell site to continue processing the call.

10. The method of claim 9, wherein the step of monitoring comprises the step of alternately monitoring the first cell site and the second cell site to detect an incoming call routed through the first cell site or through second cell site.

11. In a time division multiple access (TDMA) radio communication system having first and second cell sites that operate first and second control channels, respectively, the first and second control channels having synchronous time slots including broadcast slots for broadcasting cell data, and control slots for subscriber interaction, a method at a subscriber unit affiliated with the first cell site, the method comprising the steps of:

executing, over a transition period, a procedure to switch site affiliation to the second cell site at a particular time when the subscriber unit is not engaged in a call;

receiving data from the second cell site on successive broadcast slots of the second control channel;

monitoring control slots of the first control channel, in between receipt of data from the second cell site, to detect an incoming call received by the first cell site during the transition period;

when an incoming call received by the first cell site is detected during the transition period:
aborting the procedure to switch site affiliation; and
accepting the incoming call through the first cell site; and when no incoming call is detected during the transition period, completing the procedure to switch site affiliation to the second site.

12. The method of claim 11, further comprising the step of, after the step of accepting the incoming call, executing a hand-over procedure to transfer the incoming call to the second cell site.

13. The method of claim 11, further comprising the step of, alternately monitoring for an incoming call on control slots of the first control channel and on control slots of the second control channel.

* * * * *